Patented Aug. 16, 1932

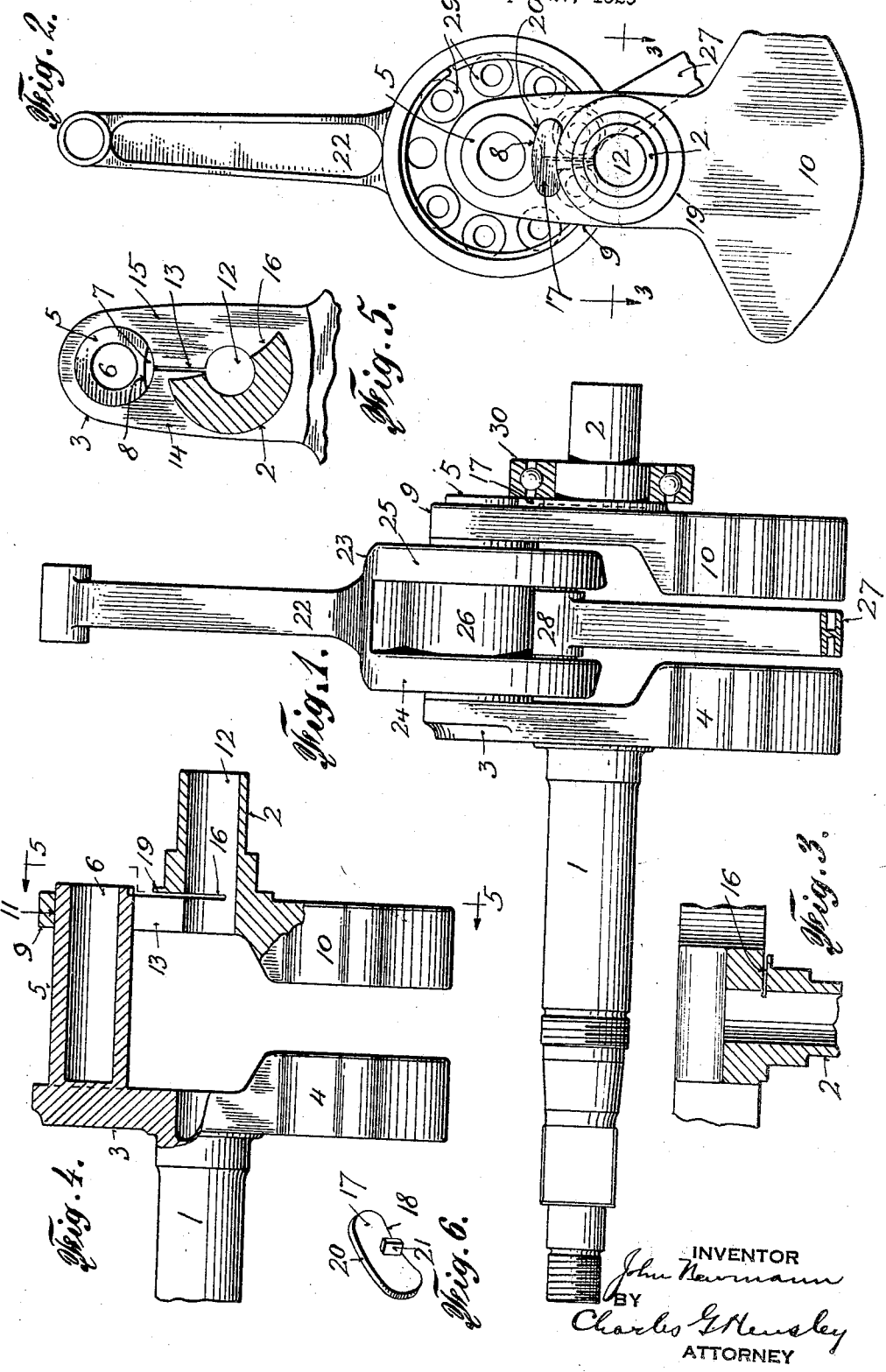

1,871,729

UNITED STATES PATENT OFFICE

JOHN NEWMANN, OF BROOKLYN, NEW YORK

CRANK CONNECTION FOR RADIAL MOTORS

Refile of application Serial No. 395,508, filed September 27, 1929. This application filed July 17, 1931.
Serial No. 551,429.

The present case is a refiling of my application Serial No. 395,508, filed September 27th, 1929.

The present invention relates to crank connections and while it is especially adapted for radial motors for use on aeroplanes, the invention is not necessarily limited to the embodiment herein shown, nor to the specific use set forth. The invention relates to that type of crank connection for radial motors wherein an annular bearing member is integral with or connected to a master connecting rod and wherein a plurality of connecting rods are pivotally connected with the annular bearing member so that a number of cylinders may be arranged around a common axis and have the connecting rods operating on a common crank. While the invention is adapted for various uses wherever a crank throw is provided on a shaft, it is especially adapted for the type of radial motor above described.

One of the objects of the invention is to provide a crank connection wherein the number of parts is reduced to a minimum for the purpose of simplicity and economy and to reduce the total weight. Another object of the invention is to eliminate the use of screws, bolts and other threaded members in the crank connection, in order to eliminate the danger of threaded members becoming loosened by reason of vibration or from the ordinary operation of the movable parts.

Another object is to permit the crank throw to be made of detachable parts, which may be assembled quickly and which will be rigid and dependable when in operative or assembled condition. Another object is to provide a construction permitting counterweights to be formed integral with the crank throw and which will permit portions of the crank throw to be disassembled in order that a one piece bearing member may be assembled on the wrist pin and the crank throw assembled after the bearing member has been positioned.

In former devices it has been customary, in one type of device, to make the bearing member of the master rod for radial motors in separate or detachable parts where the crank throw has been made in one piece, in order to permit the bearing member to be assembled on the wrist pin of the crank throw. In other cases the crank throw has been adapted to be disassembled in order to permit a one piece bearing to be assembled on the wrist pin and permit parts of the crank throw to be assembled after the one piece bearing member was assembled on the wrist pin.

The present invention relates to the latter type of device but it is stronger, more dependable, simpler and avoids the use of threaded members. Other advantages and objects will be apparent from the following detailed description of my invention.

In the drawing forming part of this application,

Figure 1 is an elevation of a crank connection illustrating my invention in the preferred form and adapted for use with a radial motor and in this view only one of the articulated connecting rods is illustrated for the purpose of simplicity, Figure 2 is an end elevation of the device in which view only one of the articulated connecting rods is shown the same as in Figure 1, Figure 3 is a sectional view taken on the line 3—3 of Figure 2, Figure 4 is an elevation partly in section, showing the parts of the crank throw, Figure 5 is a sectional view taken on the line 5—5 of Figure 4, and Figure 6 is a perspective view of a locking key.

In the drawing I have shown two shaft sections 1 and 2 which are disposed in axial alignment when the members of the crank throw are in assembled condition, and this may represent the crank shaft of an aeroplane engine or any other type of mechanism. On one of these shaft sections, to wit, the section 1, there is integrally formed a laterally projecting arm 3 forming part of the crank throw and if desired the counterweight 4 may be formed to extend in the opposite direction from the shaft section 1 to the arm 3 for counterbalancing the opposed portions of the crank throw. The wrist pin 5 which projects at right angles to the arm 3 is preferably made integral therewith and it lies parallel with but offset from the axis of the shaft.

I have shown this wrist pin as being made hollow with an internal bore 6 to reduce the weight thereof and on its outer or free end the wrist pin is provided with a notch or cut out 7 having an arcuate surface 8 for the purpose which will be pointed out hereinafter.

The shaft section 2 has formed integral therewith a crank arm 9 which also forms a part of the crank throw and this arm is disposed at right angles to the axis of the shaft and parallel with the crank arm 3.

If desired the counterweight 10 may be formed integral with the shaft section 2 to lie parallel with the counterweight 4 so that both counterweights co-operate to counterbalance the crank throw and parts connected with it. The crank arm 9 is provided with a lateral bore 11 to receive the free end of the wrist pin and this bore is so proportioned as to form a pressing fit on the end of the wrist pin. Preferably it is so proportioned that a slight expansion is required in forcing the crank arm onto the end of the wrist pin.

It will be noted that the shaft section 2 is made hollow by providing a longitudinal bore 12. I have provided a slot or cut 13 which extends from the bore 11 which receives the wrist pin, to the bore 12 of the shaft sections, the cut being made in the metal forming the crank arm 9. This permits the two sections 14, 15 or halves of the crank arm 9 to be expanded slightly in order to slightly enlarge the bore 11 when the crank arm is being pressed or forced onto the end of the wrist pin, so that when the crank arm is in the assembled position shown in Figure 1 the resiliency of the metal of which the crank arm is made will cause it to return to normal position and in so doing cause the end of the wrist pin to be grasped snugly in the bore 11.

In order to permit the section 15 of the crank arm to spring slightly in the manner described I form another cut 16 disposed in a plane at right angles to the cut 13. This latter cut 16 extends into the shaft section 2 adjacent the cheek of the crank arm 9. This cut extends only partially through the shaft section as more clearly illustrated in Figure 5, so that the latter is unattached to the crank arm across the gap of the slot 13 and some distance below the same on one side. This cut 16 as stated herein is to permit the portions 14, 15 on each side of the cut 13 to expand slightly during the operation of applying the crank arm to the wrist pin.

It is necessary, in assembling the crank throw, to have the crank arms 3 and 9 in alignment and it is desirable to provide means for indicating this alignment and for keeping the members of the crank throw in alignment. For this purpose I have provided the key shown in Figure 6, which consists of a small plate 17 having a curved bottom edge 18 corresponding with the curvature of the shoulder 19 of the shaft section 2 and having a curved upper edge 20 corresponding with the curvature of the shoulder 8 formed by the notch 7 in the end of the wrist pin. On the inner side of this key I provide a projecting tongue 21 which is made sufficiently narrow or thin to enter the narrow cut 13 referred to in the above description.

One of the purposes of the present invention is to permit of the use of a one piece bearing member in the crank connection. In the drawing I have shown a master connecting rod 22 with which there is integrally formed an annular bearing member 23 having spaced parallel plates or flanges 24, 25 between which is a hub 26 centrally located and provided with a bore adapted to fit onto the wrist pin 5. There are various articulated connecting rods 27 having heads 28 disposed in the space between the parallel flanges 24, 25 and these are connected with the bearing member by means of knuckle pins 29.

In assembling the device the bearing member 23 together with the master connecting rod 22 is inserted over the free end of the wrist pin before the shaft section 2 and crank arm 9 are assembled. After the bearing member 23 has been placed over the wrist pin the shaft section 2 and crank arm 9 may be assembled on the wrist pin. Preparatory to this the key 17 is placed with its arcuate edge 18 resting on the flange 19 and with the lug 21 projecting into the cut 13.

The shaft section 2 and the crank arm 9 are then presented for assembly in position for the end of the wrist pin to be pressed into the bore 11 of the crank arm 9. The operator holds the key 17 in the position above described and the crank arm 9 is pressed or forced onto the free end of the wrist pin. In order to move the crank arm 9 into the fully assembled position the operator will be guided by the key 17 so that he will cause the upper, arcuate edge 20 of the key to register with the curved shoulder 8 on the end of the wrist pin.

If these parts are not in proper register it may be necessary to slightly turn the crank arm and shaft section in relation to the wrist pin in order to make the top edge 20 of the key register with the curved shoulder 8 until the crank arm 9 is fully driven or pressed onto the wrist pin to the position indicated in Figures 1, 2 and 4. When the crank arm 9 is being pressed onto the end of the wrist pin the metal on opposite sides of the cut 13 can expand slightly and its tendency to return due to the resiliency of the metal will cause the end of the wrist pin to be tightly grasped within the bore 11. When the upper edge 20 of the key enters the notch 7 with the curved edge 18 registering with the shoulder 19 the operator will be assured that the crank arms and counterweights of the crank throw are in perfect alignment, due to the registering action of the key.

Furthermore, while the device is in operation, the parts of the crank throw will not get out of alignment and disturb the timing action of the motor, because of the presence of the key. The key is not required to withstand any great stresses because there is no great force tending to cause disalignment of the crank arms of the device.

When the parts are fully assembled the casing 30 of the roller or ball bearing in which the shaft section 2 is mounted will lie against the face or adjacent the face of the key 17, as shown in Figure 1, and thus prevent the key from being dislodged. The key is held from moving upwardly or downwardly by engagement with the flange 19 and with the wrist pin and it is held in one direction by the cheek of the crank arm 9 so that when the cage 30 of the bearing of the shaft section is in position the key is held against displacement in all directions. This key forms a simple means for securing accurate alignment of the crank arms during the assembling operation and it avoids the necessity of providing threaded parts on the crank throw for securing and maintaining alignment.

It will be apparent from the above that I have provided a simple but substantial crank throw for radial motors of a two-piece type which permits of partial disassembly for the purpose of mounting a one-piece master rod and bearing on the wrist pin and which permits the two piece crank throw to be quickly assembled after the bearing member has been positioned. The construction insures a tight fit between the detachable crank arm and the wrist pin without the use of threaded members.

Having described my invention, what I claim is:

1. In a crank construction for motors, the combination of a shaft composed of aligned sections, a crank arm on one of said sections, a wrist pin on said crank arm, a second crank arm on the second shaft section, said latter crank arm having an aperture to receive said wrist pin, said second shaft section having a central bore, said second crank arm and second shaft section having a cut or slot extending from the wrist pin aperture of said second crank arm to the bore of said second crank section and said second shaft section having a cut extending inwardly thereof adjacent said second crank arm and crossing the plane of said first cut.

2. In a crank construction for motors, the combination of a shaft section, a crank arm thereon, a wrist pin on said crank arm having a notch adjacent the free end thereof, a second shaft section, a crank arm thereon provided with a bore to receive said wrist pin, said second crank arm having a cut or slot extending from said wrist pin bore to permit said second crank arm to be sprung over said wrist pin, and a member having a portion engaging in said cut and having a portion extending into the notch of said wrist pin.

3. In a crank construction for motors, the combination of a shaft section, a crank arm thereon, a wrist pin on said crank arm having a notch on the free end thereof, a second shaft section, a second crank arm thereon, provided with a bore to receive said wristpin, said second crank arm having a cut extending from said bore, a key having a curved surface for engaging a portion of said second shaft section, and having a portion projecting into the notch of said wrist pin, and having a tongue extending into said cut, said key securing the alignment of said crank arms.

4. In a crank construction for motors, the combination of a shaft section, a crank arm thereon, a wristpin on said crank arm, said wrist pin having a notch in the free end thereof, a second shaft section, a crank arm thereon, provided with a bore to receive the end of the wrist pin, a key adapted to slide lengthwise of said wrist pin and to engage in the notch of said wrist pin and lie against the cheek of said second crank arm, said key having means engaging said second crank arm to secure alignment of said crank arms.

Signed at the city, county and State of New York, the 24th day of June, 1931.

JOHN NEWMANN.

CERTIFICATE OF CORRECTION.

Patent No. 1,871,729.  August 16, 1932.

JOHN NEWMANN.

It is hereby certified that the above numbered patent was erroneously issued to the inventor said "Newmann" whereas said patent should have been issued to Charles G. Hensley, of New York, N. Y., Receiver of said John Newmann, as shown by the records of assignments in this office; and that the said Letters Patent should be read with this correction therein that the same may conform to the record of the case in the Patent Office.

Signed and sealed this 22nd day of November, A. D. 1932.

M. J. Moore,
Acting Commissioner of Patents.

(Seal)